Nov. 23, 1943.                C. D. ALLEN                     2,334,980
                              MOTOR VEHICLE
                          Filed Sept. 14, 1942            4 Sheets-Sheet 1

C. D. Allen
INVENTOR.

BY CAKnowles

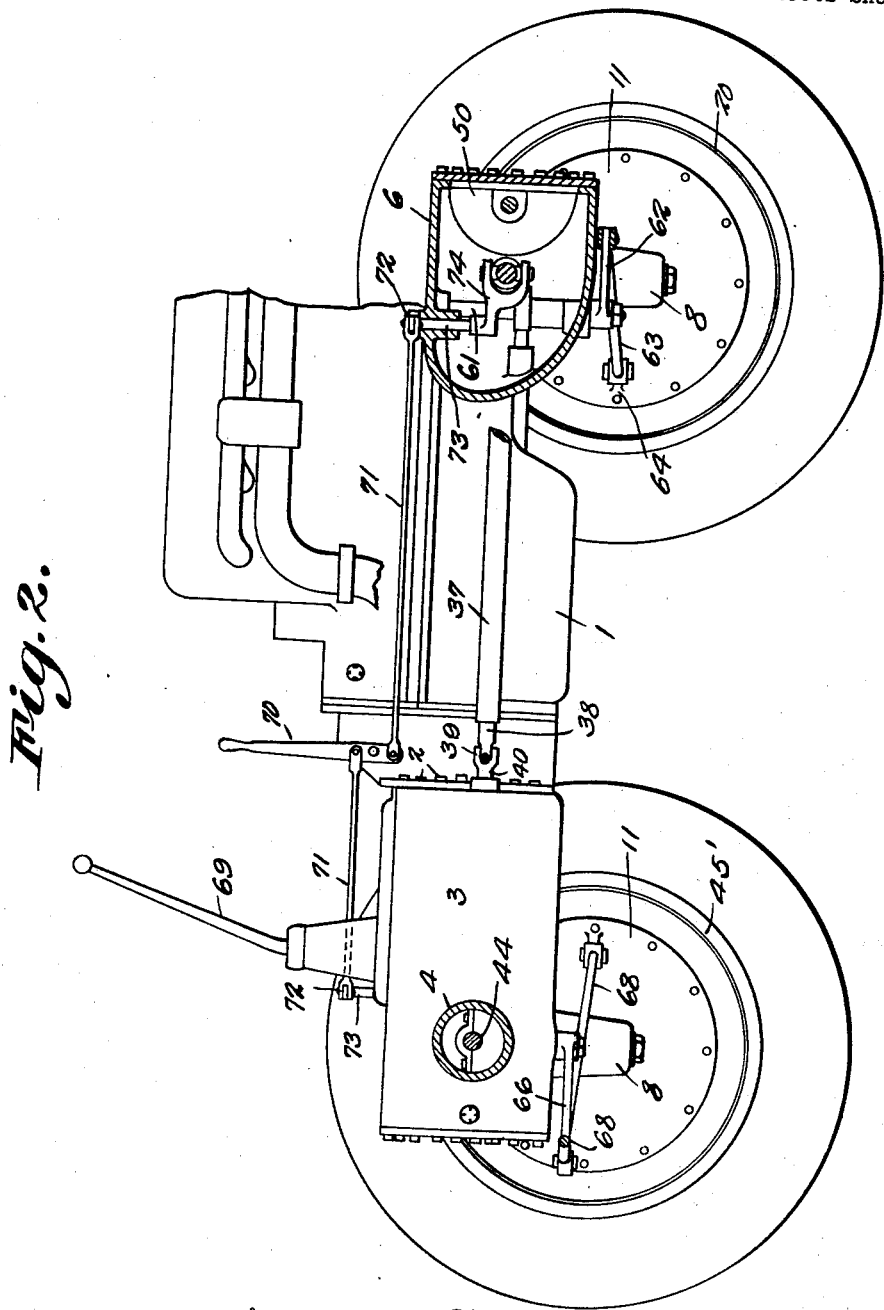

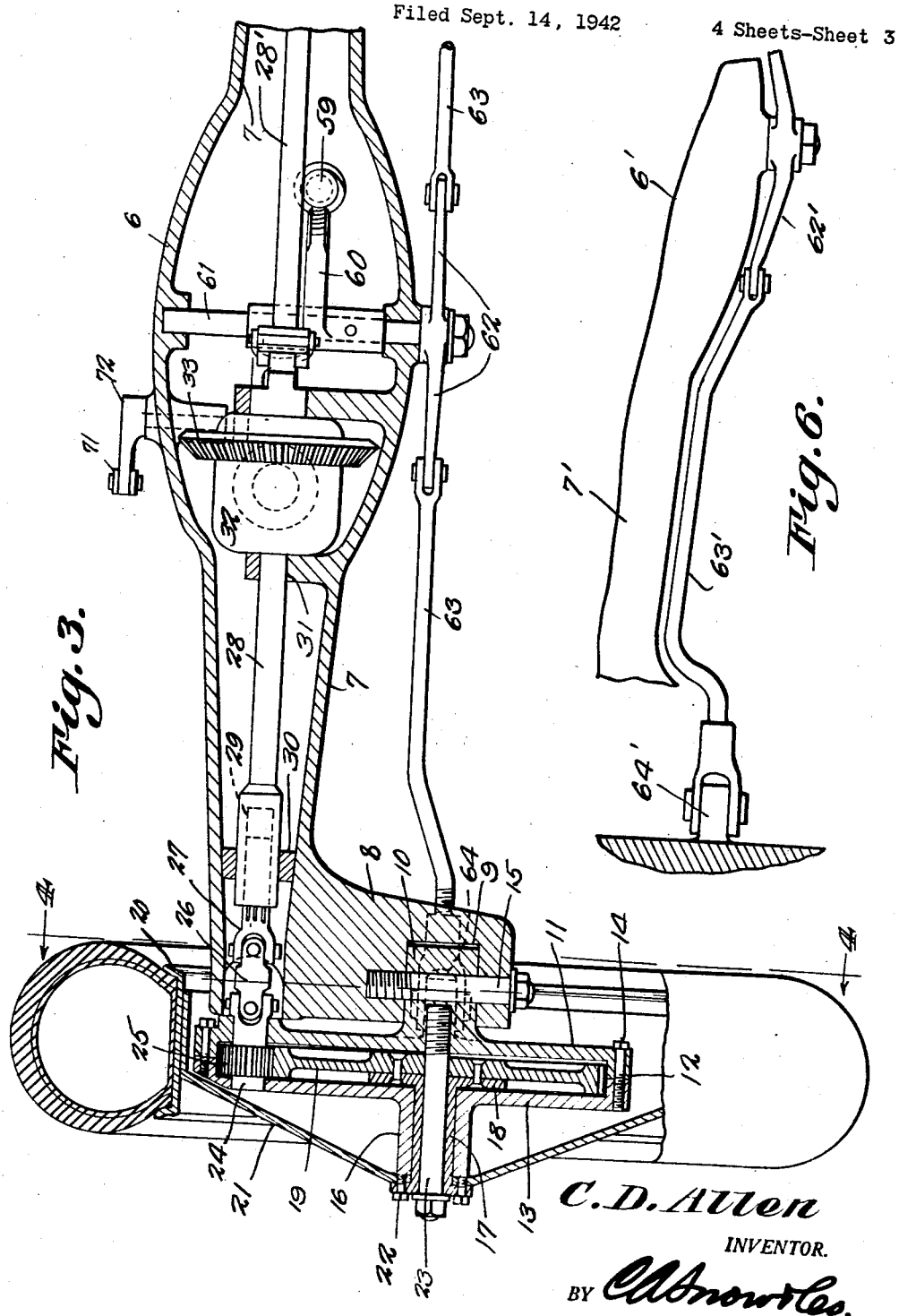

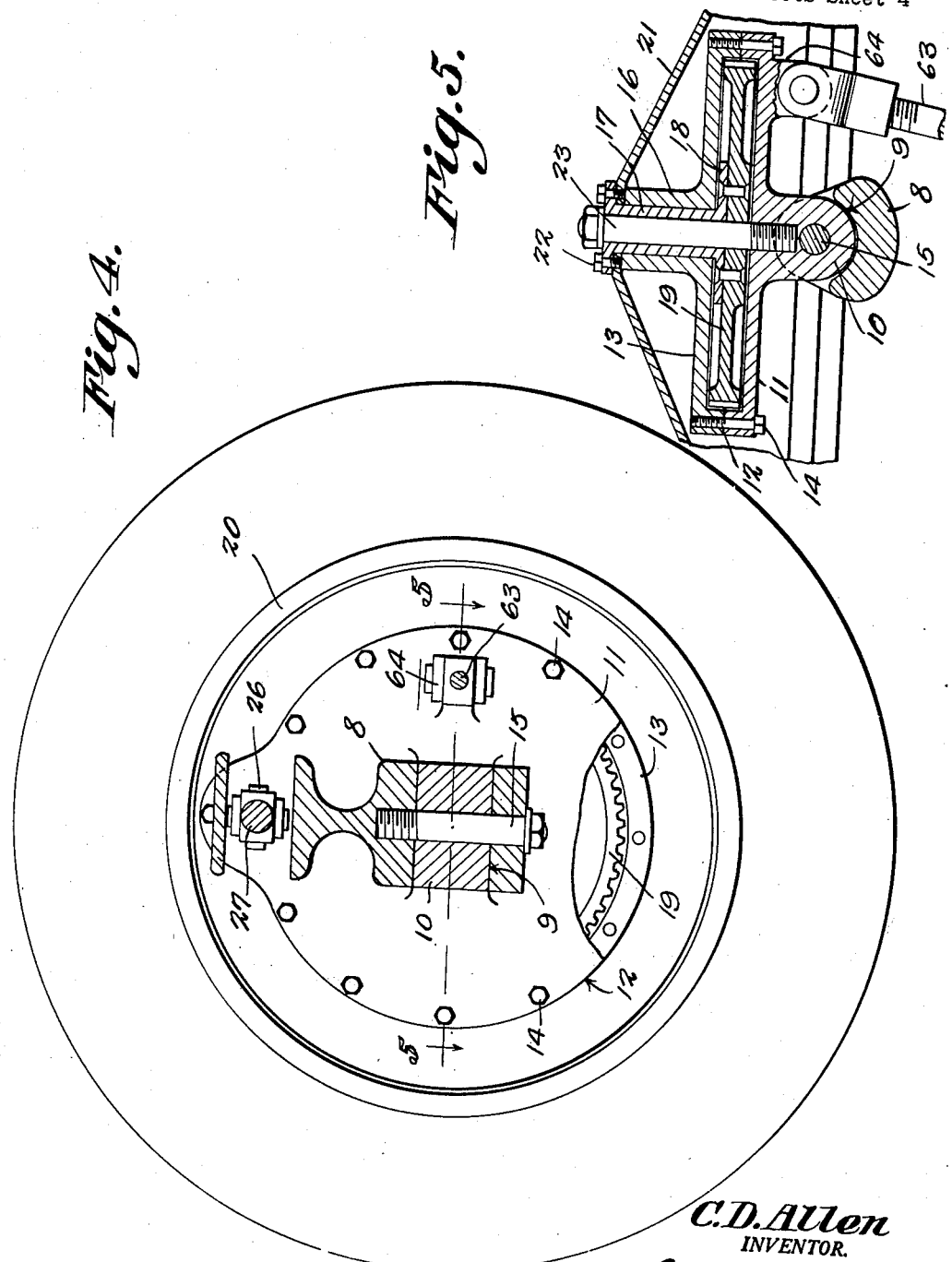

Patented Nov. 23, 1943

2,334,980

UNITED STATES PATENT OFFICE 2,334,980

MOTOR VEHICLE

Carling D. Allen, Kingston, Utah

Application September 14, 1942, Serial No. 458,266

5 Claims. (Cl. 180—47)

This invention relates to motor vehicles and more particularly to the construction of a chassis designed primarily for use as a part of a tractor.

An object of the invention is to materially simplify the construction of the vehicle, afford maximum protection for the mechanism used in driving and steering the vehicle, and to provide a chassis structure particularly adapted for use as a part of a vehicle having a four-wheel drive and in which the four wheels are also shiftable for steering purposes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 2 is a view partly in side elevation and partly in section, some of the parts being broken away.

Figure 3 is an enlarged section on line 3—3, Figure 1.

Figure 4 is a section on line 4—4, Figure 3.

Figure 5 is a section on line 5—5, Figure 4.

Figure 6 is a view partly in elevation and partly in section showing one of the connecting rods and the parts to which it is attached.

Figure 1:
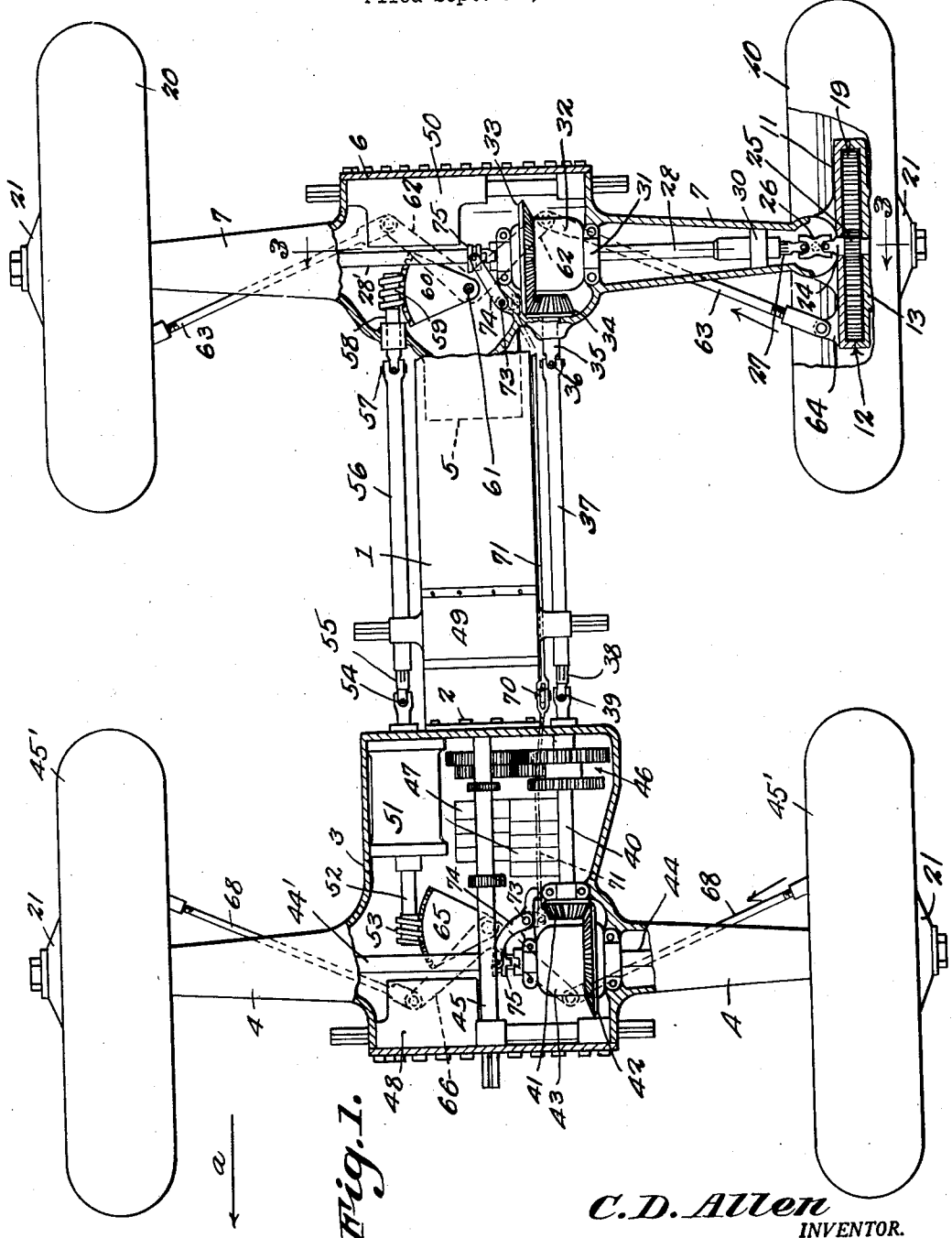
Figure 1 is a view partly in plan and partly in section of the structure constituting the present invention.

Referring to the figures by characters of reference, 1 designates a tubular engine housing bolted, as at 2, to a transmission housing 3 having integral oppositely extending alined tubular arms 4 constituting the front axle of the vehicle.

Swiveled within and suitably joined to the other end of the engine housing 1 is the tubular extension 5 of the rear housing 6 having oppositely extending, alined tubular arms 7 constituting the rear axle of the vehicle. Each of the arms 7 has an integral fixed knuckle member 8 depending therefrom and recessed in its outer face, as at 9, so as to straddle an ear 10 extending from the center of the inner side 11 of a gear housing 12 the outer side portion 13 of which is detachably secured to the inner portion 11 by means of bolts 14 or the like. A knuckle king pin 15 is extended into the knuckle member 8 and through the ear 10 so as to constitute the pivot on which said ear and the housing 12 is adapted to swing.

The outer member 13 of housing 12 has an outwardly extended tubular bearing member 16 concentric therewith and also integral therewith. In this bearing member is journalled a tubular shaft 17 having a flange 18 at one end which is attached to a large or main gear 19 located in the housing 12.

A wheel 20 is extended around the housing and is coaxial therewith, said wheel having a disk 21 secured at its center to the outer end of tubular shaft 17 as shown at 22 and said wheel, disk, shaft and gears are all held securely in proper relation to each other by a bolt 23 which is extended into the member 11 as shown.

Journalled in the upper end of each housing 12 where it is alined with the longitudinal center of the adjacent axle member 7, is a short shaft 24 carrying a small gear 25 which is in constant mesh with the gear 19. Shaft 24 is connected by a double universal joint 26 to the member 27 of the axle shaft the other member 28 of which has a socket 29 in which member 27 is mounted to slide but in which it is keyed so as to prevent relative rotation of the two shaft members. Shaft 28 is journalled in a suitable bearing 30 provided therefor in the arm 7 and also in another bearing 31 close to the housing 6.

A differential housing 32 is located in housing 6 and the main gear 33 thereof is located where it can receive motion through a gear 34 from a short shaft 35 journalled in housing 6. This shaft 35 is connected by a universal joint 36 to the main section 37 of a telescopic drive shaft located outside of the housing 1 and parallel therewith, the other member of this shaft 37 and which has been indicated at 38 being adapted to slide in the member 37 but incapable of rotating relative thereto. A universal connection 39 is provided between shaft section 38 and a shaft 40 which is journalled in the housing 3 and has a gear 41 meshing with the main gear 42 of the differential located at the front of the chassis and within the housing 3. The differential is within a housing as shown at 43 and from this housing are extended the axle shafts 44 and 44' which, in turn, are connected to the front wheels 45' in the same manner as the shafts 28 and 28' are connected to the rear wheels 20.

The main drive shaft has been indicated at 45 and suitable forward and reverse gear mechanism indicated generally at 46 can be employed for transmitting motion from this shaft 45 to the shaft 40 and thence to the two differentials and to the respective wheels. There may also be combined with the other mechanism, hydraulic mechanism indicated generally at 47 whereby, through suitable means provided therefor, separate hydraulic lifts 48, 49 and 50 may be actuated at will and whereby a hydraulic motor 51 can also be operated. This motor is adapted to drive a shaft 52 provided at one end with a worm 53 while its other end is connected by a universal joint 54 to one member 55 of a telescopic shaft the other member of which has been shown at 56. These two members are slidable relative to each other but are held against relative rotation by any suitable means. Member 56 is also connected by a universal joint 57 to a short shaft 58 in housing 6 and which has a worm 59.

The worm 59 meshes with a segmental gear 60 which is secured to and rotates with a vertical shaft 61 journalled in housing 6. This shaft is secured to a bell-crank 62 the arms of which diverge rearwardly and are connected by forwardly diverging rods 63 to ears 64 extending toward each other from the forward portions of the inner housing members 11 of the respective wheels 20.

A similar construction is provided at the front end of the chassis. Worm 53 meshes with a segmental gear 65 which, in turn, is connected to and actuates a bell-crank 66 the arms of which, however, diverge forwardly and are joined by rearwardly diverging connecting rods 68 to the rear portions of the housings 11 of the front wheels 45.

When the bell-cranks 62 and 66 are in their normal positions, the wheels 20 and 45 are held to move straightforward. When shaft 56 is rotated in one direction, the worms 53 and 59 will swing the gears 60 and 65 in one direction with the result that the two bell-cranks will also be swung in the same direction. If, for example, the bell-cranks should be swung in a clockwise direction in Fig. 1, bell-crank 66 would pull in the direction indicated by the arrow in Fig. 1 while bell-crank 62 would pull in the direction indicated by its arrow in Fig. 1. Thus all of the wheels would be simultaneously shifted about their individual vertical axes toward the left should the vehicle be traveling in the direction of arrow $a$ in Fig. 1, the curvature of the arc in which the vehicle travels being determined by the amount of movement imparted to the segmental gears. Obviously should these segmental gears be swung in the opposite direction, the vehicle would be turned in the opposite direction, all of the wheels being instantly shifted to the proper angle to insure making a proper turn.

The mechanism will of course be provided with proper means under the control of the driver for operating the transmission gears, for controlling the motor 51 and for controlling the operation of the hydraulic lifts. As these mechanisms, in themselves, constitute no part of the present invention, they have not been disclosed in detail. However the shifting lever employed for controlling the transmission gearing has been shown in Fig. 2 at 69. There is also shown in said figure a hand lever 70 connected by rods 71 to crank-arms 72 located at the upper ends of vertical shafts 73 in the respective housings 3 and 6. These shafts have forked arms 74 at their lower ends engaged in slidable clutch members 75 whereby, at the will of the operator, the differentials can be locked or unlocked.

If desired, and as shown in Fig. 6, the connecting rods between the bell-cranks and the respective wheels can be arranged close under and substantially parallel with the respective housings and their arms. In said figure one of the bell-cranks has been indicated at 62', the ear on the wheel has been indicated at 64' and the connecting rod, which is positioned under and parallel with the housing has been indicated at 63'. A portion of the housing and one of its tubular arms has been shown at 6' and 7'. This arrangement so elevates the connecting rods that the tractor is better able to pass over obstructions than should the rods be extended straight to the wheels from the bell-cranks or approximately straight as shown for example in Fig. 3.

What is claimed is:

1. In a motor vehicle a chassis including a tubular engine housing, a transmission housing fixedly joined to one end thereof, arms extending in opposite directions therefrom and constituting axle members, a housing swiveled to the other end of the engine housing, arms extending in opposite directions therefrom and constituting axle members, wheels pivotally connected to the respective axle members, a differential within each of the end housings, means for transmitting motion from each differential to the respective wheels connected to the housing in which the differential is located, and means for operatively connecting the differentials for simultaneous operation.

2. In a motor vehicle a chassis including a tubular engine housing, a transmission housing fixedly joined to one end thereof, tubular arms extending in opposite directions therefrom and constituting axle members, a housing having a swivel connection with the other end of the engine housing, tubular arms extending in opposite directions therefrom and constituting axle members, wheels pivotally connected to the respective axle members, a differential within each of the end housings, means for transmitting motion from each differential to the respective wheels connected to the housing in which the differential is located, means for operatively connecting the differentials for simultaneous operation, said means including a telescopic shaft, gears meshing with the respective differentials, and connections between said gears and the telescopic shafts, each of said connections including a universal joint.

3. In a motor vehicle a chassis including a tubular engine housing, a transmission housing fixedly joined to one end thereof, tubular arms extending in opposite directions therefrom and constituting axle members, a housing swiveled to the other end of the engine housing, tubular arms extending therefrom and constituting axle members, wheels pivotally connected to the respective axle members, a differential within each of the end housings, means for transmitting motion from each differential to the respective wheels connected to the housing in which the differential is located, means for operatively connecting the differentials for simultaneous operation, oppositely disposed bell-cranks connected to the respective housings, rods connecting each bell-cranks to the wheels associated with the housing on which the bell-crank is mounted, and means for simultaneously actuating the bell-crank to simultaneously swing the wheels about individual axes.

4. In a motor vehicle a chassis including a tubular engine housing, a transmission housing fixedly joined to one end thereof, tubular arms extending in opposite directions therefrom and constituting axle members, a housing swiveled in the other end of the engine housing, tubular arms extending in opposite directions therefrom and constituting axle members, wheels pivotally connected to the respective axle members, a differential within each of the end housings, means for transmitting motion from each differential to the respective wheels connected to the housing in which the differential is located, means for operatively connecting the differentials for simultaneous operation, oppositely disposed bell-cranks connected to the respective housings, rods connecting each bell-crank to the wheels associated with the housing to which the bell-crank is connected, the corresponding rods of the two bell-cranks converging laterally and outwardly, and means for simultaneously actuating the bell-crank in one direction.

5. In a motor vehicle a chassis including a tubular engine housing, a transmission housing fixedly joined to one end thereof, tubular arms extending in opposite directions therefrom and constituting axle members, a housing swiveled in the other end of the engine housing, tubular arms extending in opposite directions therefrom and constituting axle members, wheels pivotally connected to the respective axle members, a differential within each of the end housings, means for transmitting motion from each differential to the respective wheels connected to the housing in which the differential is located, means for operatively connecting the differentials for simultaneous operation, oppositely disposed bell-cranks connected to the respective housings, rods connecting each bell-crank to the wheels associated with the housing to which the bell-crank is connected, the corresponding rods of the two bell-cranks converging laterally and outwardly, and means for simultaneously actuating the bell-crank in one direction, said means including a segmental gear rotatable with each bell-crank, shafts journalled in the respective housings, worms carried thereby and meshing with the respective segmental gears, means for driving one of the shafts, and a telescopic shaft connection between the shafts, said connection including universal joints.

CARLING D. ALLEN.